(12) United States Patent
Kameyama

(10) Patent No.: US 6,351,345 B1
(45) Date of Patent: *Feb. 26, 2002

(54) AIR BEARING SLIDER AND METHOD OF PRODUCING THE SAME

(75) Inventor: Masaki Kameyama, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/334,909

(22) Filed: Jun. 17, 1999

(30) Foreign Application Priority Data

Jan. 12, 1999 (JP) ............................. 11-004934

(51) Int. Cl.$^7$ ................................. G11B 5/60
(52) U.S. Cl. ................ 360/236.3; 360/235.6; 360/235.7; 360/235.8; 360/236.2
(58) Field of Search .............. 360/235.6, 235.7, 360/235.8, 236.3, 236.6, 236.2

(56) References Cited

U.S. PATENT DOCUMENTS

| | | | |
|---|---|---|---|
| 5,086,360 A | 2/1992 | Smith et al. ................. | 360/103 |
| 5,309,303 A | 3/1994 | Hsia et al. ................... | 360/103 |
| 5,550,693 A | 8/1996 | Hendriks et al. ........... | 360/103 |
| 5,734,522 A | 3/1998 | Shrinkle | |
| 5,777,825 A | * 7/1998 | Dorius ........................ | 360/103 |
| 5,822,153 A | 10/1998 | Lairson et al | |
| 5,825,588 A | * 10/1998 | Bolasna et al. ............. | 360/103 |
| 5,841,608 A | * 11/1998 | Kasamatsu et al. ......... | 360/103 |
| 6,040,958 A | 3/2000 | Yamamoto et al. | |
| 6,055,128 A | 4/2000 | Dorius et al. | |
| 6,144,529 A | 11/2000 | Wada et al. ............. | 360/236.1 |

FOREIGN PATENT DOCUMENTS

| | | |
|---|---|---|
| JP | 4159671 | 2/1992 |
| JP | 08147917 | 7/1996 |
| JP | 09115258 | 2/1997 |
| JP | 09106528 | 4/1997 |
| JP | 10050019 | 2/1998 |
| JP | 10050020 | 2/1998 |

* cited by examiner

*Primary Examiner*—Robert S. Tupper
(74) *Attorney, Agent, or Firm*—Greer, Burns & Crain, Ltd.

(57) ABSTRACT

An air bearing slider capable of reducing to the utmost variations in its flying height, irrespective of its movement along the radial direction of the storage disk. A larger positive pressure (or lift) can be generated at the air bearing surface when the air bearing surface receives an air stream running along the front raised surface and the front wall during rotation of the storage disk. Even when the air stream approaches from different directions, it still reaches the air bearing surface through the constant area of the front raised surface and the front wall. Accordingly, variations in the direction of the air stream fail to cause variations in the positive pressure at the air bearing surface, so that variations in the flying height of the slider can be reduced to the utmost irrespective of its radial movement along the storage disk.

14 Claims, 12 Drawing Sheets

AIR BEARING SLIDER AND METHOD OF PRODUCING THE SAME

BACKGROUND OF THE INVENTION

An air bearing slider is often employed in magnetic disk drives, for example. The slider is capable of flying above the disk surface of the magnetic disk when it receives an air stream generated along the disk surface during rotation of the magnetic disk. The air bearing slider allows a transducer element (which is embedded in the slider body to oppose the disk surface) to achieve read/write operations upon the magnetic disk without contacting the disk surface.

The air bearing slider is usually supported at the tip end of a carriage arm. When the carriage arm swings around its support axis, the air bearing slider is allowed to cross recording tracks on the disk surface in the radial direction of the magnetic disk. This movement of the slider allows the transducer element to be positioned above a target recording track on the disk surface.

When the swinging movement of the carriage arm is employed to position the transducer element, it is impossible to maintain the air bearing slider in a constant orientation with respect to the tangential direction of the recording tracks. As the slider moves in the radial direction of the magnetic disk, the slider varies its orientation with respect to the recording tracks. Accordingly, the slider receives the air stream from somewhat different directions as it moves in the radial direction. This variation in the direction of the air stream causes variations in the flying height of the slider above the disk surface. It should be noted that throughout this specification the distance between the slider and the disk surface will be referred to as the flying height above the disk surface. However, such "flying height" also refers to the distance between the slider and the disk surface in sliders flying below the disk surface.

If larger variations are caused in the flying height of the slider, the increment of the height above the lowest flying level of the slider must be increased. In particular, such an increased increment at the rear rail in which the transducer element is embedded causes the transducer element to be farther separated from the disk surface, and weakens the sense of the transducer element in read/write operations. This leads to a disadvantage in attempts to improve the recording density of the magnetic disk.

It is accordingly an object of the present invention to provide an air bearing slider capable of reducing to the utmost the variations in the flying height of the slider, irrespective of its movement along the radial direction of the storage disk.

SUMMARY OF THE INVENTION

Briefly, the present invention relates to an improved air bearing slider in which variations in its flying height are reduced, even as it travels radially across a disk. The present invention also relates to a disk apparatus employing such a slider, as well as to the method for manufacturing such a slider.

More specifically, the present invention relates to an air bearing slider that includes a front air bearing surface formed on a bottom of a slider body near an upstream end thereof, a rear air bearing surface formed on the bottom of the slider body near a downstream end thereof and a front raised surface formed upstream of the rear air bearing surface. The front raised surface has a level that is higher than that of the rear air bearing surface. The slider also includes a front wall that extends between an upstream end of the rear air bearing surface and a downstream end of the front raised surface and at least one side wall that extends between a side edge of the rear air bearing surface and the bottom of the slider body without being interrupted by a step. Note that the term "step" is defined, throughout the specification and claims, to exclude a step which fails to reach a level high enough to contribute to an increase in the positive pressure generated at an air bearing surface when the air bearing slider receives the air stream.

With the above structure, a larger positive pressure or lift can be generated at the rear air bearing surface when the rear air bearing surface receives an air stream flowing along the front raised surface and the front wall during rotation of the storage disk. Since no raised surface adjacent the rear air bearing surface is formed on the side wall, the air stream, which may travel in different directions, will always reach the rear air bearing surface through a constant area of the front raised surface and the front wall. Accordingly, variations in the direction of the air stream fail to cause variations in the positive pressure at the rear air bearing surface, so that variations in the flying height of the slider can be reduced to the utmost, irrespective of the movement of the slider in the radial direction of the storage disk.

The air bearing slider of the present invention may further include a second rear air bearing surface, which, when combined with the rear air bearing surface mentioned above, forms a pair of rear air bearing surfaces, which are both positioned near a downstream end of the slider body. This pair of rear air bearing surfaces creates a pair of positive pressures near the downstream end of the slider body that contribute to stabilizing the behavior of the air bearing slider during flying.

One preferred embodiment of the present invention further includes a second front raised surface formed upstream of the second rear air bearing surface, with the second front raised surface having a level that is higher than that of the second rear air bearing surface, as well as a second front wall that extends between an upstream end of the second rear air bearing surface and a downstream end of the second front raised surface. This embodiment may further include side raised surfaces formed on both sides of the second rear air bearing surface, wherein the side raised surfaces extend in opposite lateral directions at a level that is higher than that of the second rear air bearing surface, as well as a set of second side walls that extend between lateral edges of the side raised surfaces and the second rear air bearing surface. With this additional structure a larger positive pressure or lift can be generated at the second rear air bearing surface, as well as at the above-mentioned first air bearing surface, when the second rear air bearing surface receives an air stream flowing along the second front raised surface and the second front wall during rotation of the storage disk.

The air bearing slider may further include a third front raised surface formed upstream of the front air bearing surface that has a level that is higher than that of the front air bearing surface, and a protrusion formed on the third front lower surface that has a tip end that is lower than the level of the front air bearing surface. The protrusion serves to avoid direct contact between the front air bearing surface and the disk surface of the storage disk when the slider body is seated on the disk surface, so that there is less adhesion between the lubricating agent or oil spread upon the disk surface and the slider body. Accordingly, the slider body can more easily take off from the disk surface at the beginning of rotation of the storage disk.

The air bearing slider may further include a front rail formed on the bottom of the slider body at an upstream position so as to extend in the lateral direction and to define the third raised surface and the front air bearing surface on its top surface, first and second side rails extending from opposite lateral ends of the front rail toward the first and second rear air bearing surfaces, respectively, so as to define top surfaces that are on the same plane as the third raised surface of the front rail, a first rear protrusion formed on the top surface of the first side rail that has a tip end that is lower than the level of the first rear air bearing surface, and a second rear protrusion that is formed on the side lower surface and has a tip end that is lower than the level of the second rear air bearing surface. With this structure, a larger negative pressure can be generated within an area surrounded by the front rail and side rails. The larger negative pressure can be balanced with the larger positive pressure at the first and second rear air bearing surfaces in order to better stabilize the behavior of the air bearing slider during flying. Moreover, the first and second rear protrusions serve to prevent the first and second rear air bearing surfaces from directly contacting the disk surface of the storage disk when the slider body is seated upon the disk surface, so that there is less adhesion between the lubricating agent or oil spread over the disk surface and the slider body. Accordingly, the slider body can more easily take off from the disk surface at the beginning of rotation of the storage disk.

In a second embodiment, the second rear air bearing surface may be configured differently so that it lacks a set of side raised surfaces. In this embodiment, the second set of side walls extend directly between the lateral edges of the second rear air bearing and the bottom of the slider body without being interrupted by a step. With this structure, it is also possible to reduce variations in the flying height of the slider body irrespective of the movement of the slider body in the radial direction of the storage disk in much the same manner as the above mentioned first rear air bearing surface.

When the aforementioned air bearing slider is produced, the method preferably includes the steps of forming a resist of a first pattern on a wafer for defining a contour of an air bearing surface with a margin adjacent the contour of the air bearing surface in a lateral direction of a slider body, removing part of the wafer around the resist of the first pattern, forming a resist of a second pattern on the wafer for defining the contour of the air bearing surface with an additional area covered upstream of the air bearing surface, and removing part of the wafer around the resist of the second pattern so as to shape the air bearing surface.

When the air bearing surface is shaped according to the second pattern, a portion corresponding to the margin defined by the first pattern is removed adjacent the air bearing surface. As a result, no step is formed adjacent the air bearing surface in the lateral direction of the slider body. On the other hand, the covered additional area serves to shape a step upstream of the air bearing surface in the slider body. With this method, even if the second pattern is offset with respect to the first pattern, no step is formed adjacent the air bearing surface in the lateral direction of the slider body. The aforementioned air bearing slider can reliably be provided.

The method may further include the steps of forming a resist of a pad pattern on the wafer, before forming the resist of the first pattern, for defining a contour of an adhesion prevention pad with a margin around the contour of the pad, removing part of the wafer around the resist of the pad pattern so as to shape a first material, defining a margin around the contour of the pad on the first material in forming said resist of the first pattern, shaping a second material out of the first material in removing part of the wafer around the resist of the first pattern, defining the contour of the pad on the second material in forming said resist of the second pattern, and shaping the contour of the pad in removing part of the wafer around the resist of the second pattern.

When the second material is shaped out of the first material, and when the contour of the pad is shaped out of the second material, portions corresponding to the margins defined by the pad pattern and the first pattern are removed around the contour of the pad. As a result, no step is formed around the pad.

It should be noted that the air bearing slider of the present invention may be employed in hard disk drive units (HDD), as well as in other types of storage disk drives.

DESCRIPTION OF THE PREFERRED EMBODIMENTS

Figure 1:
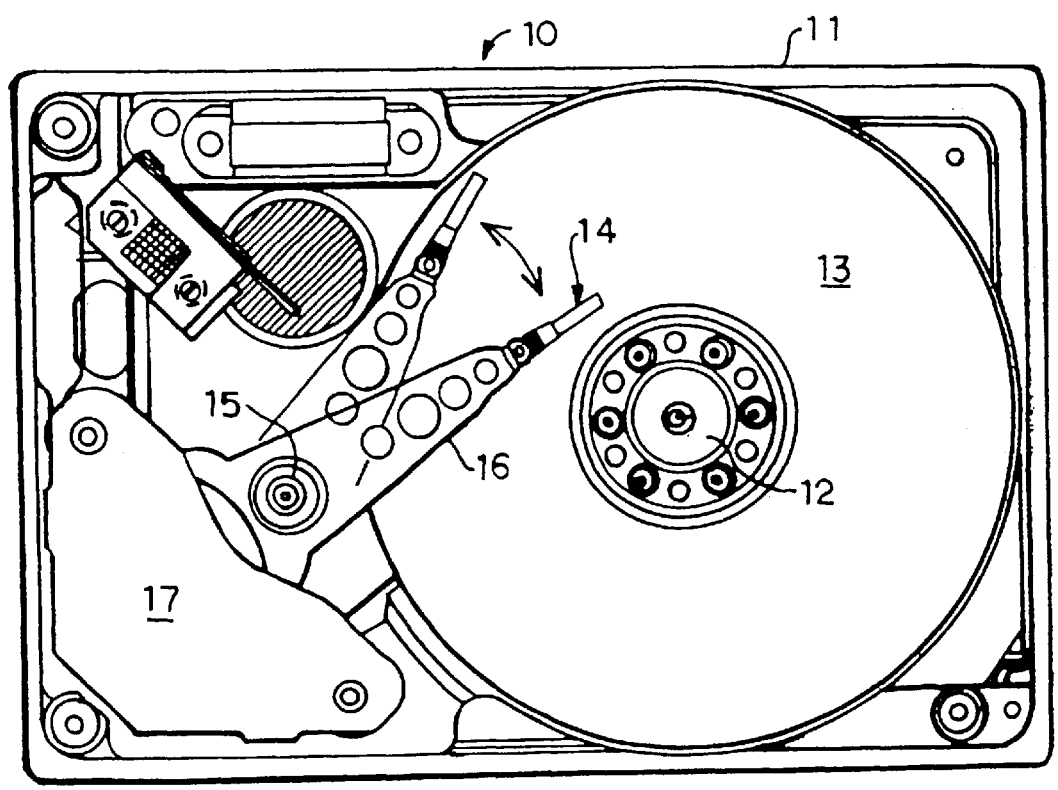
FIG. 1 is a plan view illustrating an interior of a hard disk drive unit (HDD)

FIG. 1 illustrates an interior structure of a hard disk drive unit (HDD) 10, which is an example of one type of magnetic disk drive used with the present invention. However, it should be noted that the present invention may also be applied to other types of disk drives employing floating sliders, including magneto-optical (MO) disk drives. The HDD 10 has a housing 11 for accommodating magnetic disks 13 that are mounted on a spindle motor 12, and an air bearing slider 14 that is positioned to oppose each of the magnetic disks 13. The air bearing slider 14 is fixed at the tip end of a carriage arm 16 which is capable of swinging about a support shaft 15. When information is read or written from or to the magnetic disk 13, the carriage arm 16 is driven to rotate by the action of an actuator 17, which includes a magnetic circuit, so that the air bearing slider 14 can be positioned above a target recording track on the magnetic disk 13. The interior space of the housing 11 can be closed with a cover, not shown.

Figure 2:
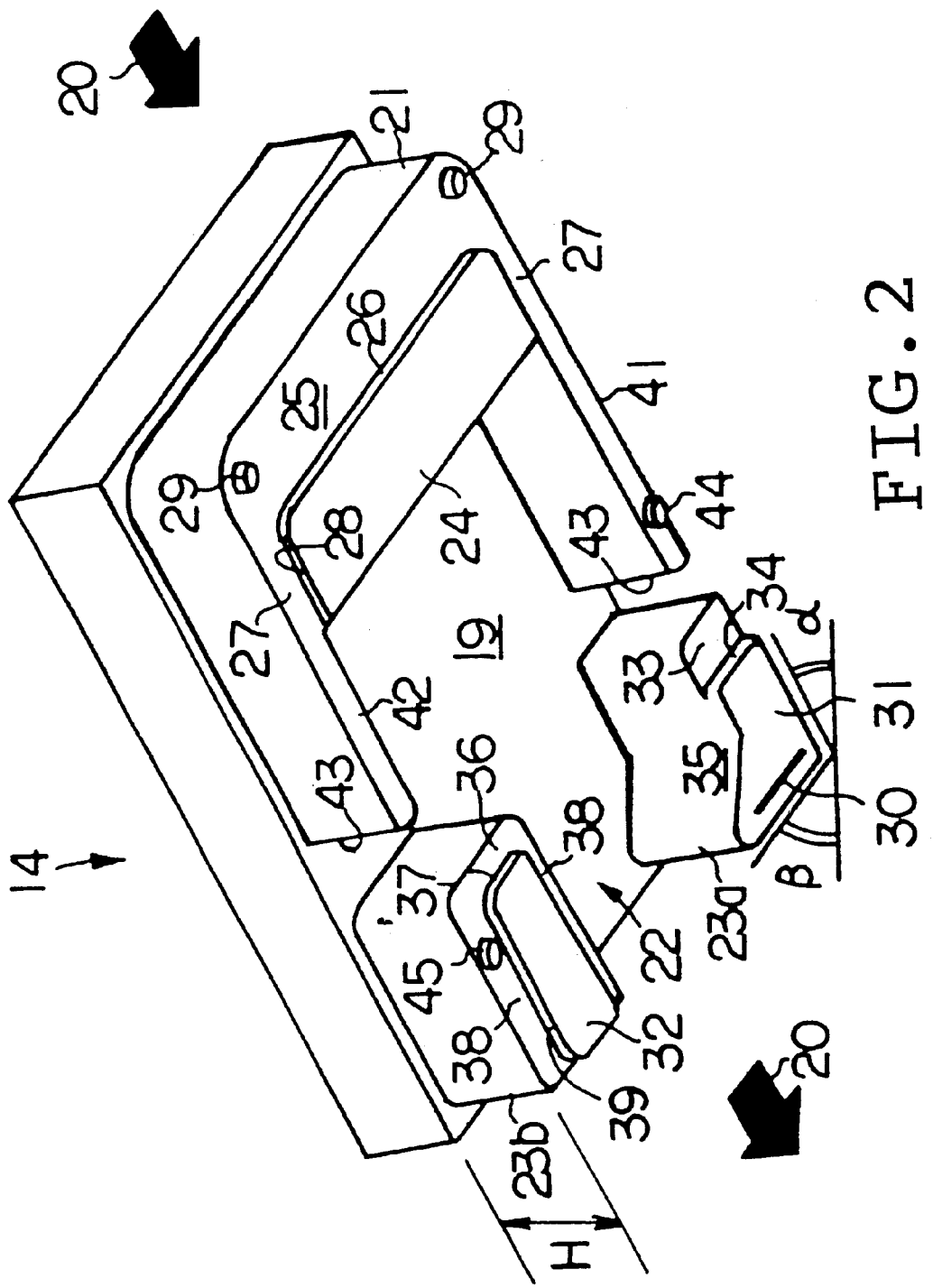
FIG. 2 is an enlarged perspective view illustrating an air bearing slider according to the present invention.

FIG. 2 illustrates the air bearing slider 14 according to the present invention. The slider 14 has a slider body that includes a bottom 19 that is positioned to oppose the magnetic disk 13. A front rail 21 is formed to extend from the bottom 19 of the slider body at its upstream end so as to extend in the lateral direction of the slider body. Likewise, a pair of rear rails 23a, 23b are formed to extend from the bottom 19 of the slider body at its downstream end and are spaced from each other in the lateral direction so as to define an air stream passage 22 therebetween. The "upstream" or "downstream" ends are defined based on the direction of the air stream 20 that is generated when the magnetic disk 13 rotates.

A front air bearing surface 24 is defined on the lower surface of the front rail 21 so as to extend in the lateral direction of the slider body. When the magnetic disk 13 rotates to generate the air stream 20 along the disk surface, the air stream 20 acts upon the front air bearing surface 24. Lift is generated on the front air bearing surface 24 so as to allow the slider body to fly above the disk surface.

A front raised surface 25 is formed upstream of the front air bearing surface 24 to a level that is higher, with respect to the disk surface, than that of the front air bearing surface 24. A front wall 26 is extended toward the bottom 19 of the slider body from the upstream end of the front air bearing surface 24 so as to reach the front raised surface 25. A pair of side raised surfaces 27 are likewise formed on both sides of the front air bearing surface 24 in the lateral direction of the slider body. The side raised surface 27 have a level that is higher, with respect to the disk surface, than the front air bearing surface 24, and are at the same level as the front raised surface 25. Side walls 28 extend toward the bottom 19 of the slider body between the side edges of the front air bearing surface 24 and each of the side raised surfaces 27. When the magnetic disk 13 rotates, the air stream flowing along the front raised surface 25 and the front wall 26 acts on the front air bearing surface 24 so as to generate a larger lift upon the front air bearing surface 24.

A pair of protrusions, namely, adhesion prevention pads 29, are formed on the front raised surface 25 at the corners thereof. The pads 29 have tip ends that extend below the level of the front air bearing surface 24. Thus, the pads 29 serve to prevent the front air bearing surface 24 from directly contacting the disk surface of the magnetic disk 13 when the slider body is seated upon the disk surface prior to rotation of the disk.

A first rear air bearing surface 31 is defined on the lower surface of the rear rail 23a. A transducer element or head element 30 is embedded in the first rear air bearing surface 31. A second rear air bearing surface 32 is likewise defined on the lower surfaces of the rear rail 23b. When the magnetic disk 13 rotates and generates the air stream 20 along the disk surface, the air stream 20 acts on the first and second rear air bearing surfaces 31, 32. Lift is generated respectively on the first and second rear air bearing surfaces 31, 32 (as well as on the front air being surface as discussed earlier), which allows the slider body to fly above the disk surface.

A front raised surface 33 is formed upstream of the first rear air bearing surface 31, and has a level that is higher, with respect to the disk surface, than the first rear air bearing surface 31. A front wall 34 extends between the front raised surface 33 and the upstream end of the first rear air bearing surface 31. A pair of side walls 35 extend between the first rear air bearing surface 31 and the bottom 19 of the slider body, and also between the front raised surface 33 and the bottom 19 of the slider body. It should be noted that these side walls 35 extend for their full heights without being interrupted by a step. Moreover, as shown in FIG. 2, the side walls 35 comprise a first side wall that extends toward the bottom 19 of the slider body from the edge defining the contour of the front raised surface 33, and a second side wall that extends toward the bottom 19 from the edge defining the contour of the first rear air bearing surface 31. The second side wall is continuously connected to the first side wall. When the magnetic disk 13 rotates, the air stream flowing along the front raised surface 33 and the front wall 34 acts upon the first rear air bearing surface 31, and generates a larger lift upon the first rear air bearing surface 31.

A front raised surface 36 is formed upstream of the second rear sir bearing surface 32, and has a level that is higher, with respect to the disk surface, than the second rear air bearing surface 32. A front wall 37 extends between the second rear air bearing surface 32 and the front raised surface 36. A pair of side raised surfaces 38 are likewise formed on each side of the second rear air bearing surface 32, and these side raised surfaces 38 extend in the lateral direction of the slider body. The side raised surfaces 38 are each of a level that is higher, with respect to the disk surface, than the level of the second rear air bearing surface 32, and area of the same level as the front raised surface 36. Side walls 39 extend between the second rear air bearing surface 32 and the side raised surfaces 38. When the magnetic disk 13 rotates, the air stream flowing along the front raised surface 36 and the front wall 37 acts on the second rear air bearing surface 32 and generates a larger lift at the second rear air bearing surface 32.

In the preferred embodiment, the lifts generated at the first and second rear air bearing surfaces 31, 32 are set to be smaller than that at the front air bearing surface 24. Accordingly, the slider body keeps a slanted attitude during flying, which is slanted by a pitch angle α. "Pitch angle α" may be referred to as an inclination angle along the longitudinal direction of the slider body (i.e., along the direction of the air stream 20). In the preferred embodiment, the pitch angle a is preferably between approximately 100 and 200 μrad.

In addition, lift generated at the second rear air bearing surface 32 is set to be larger than that at the first rear air bearing surface 31. Accordingly, the slider body keeps a slanted attitude during flying, which is slanted by a roll angle β. "Roll angle β" may be referred to as an inclination angle along the lateral direction of the slider body (i.e., along the direction perpendicular to the air stream 20). In the preferred embodiment, the roll angle β is preferably between approximately 20 and 40 μrad. A combination of the pitch angle a and the roll angle β serves to minimize the distance between the slider body and the disk surface around the transducer element 30.

First and second side rails 41, 42 are connected to the opposite lateral ends of the front rail 21, and extend downstream toward the rear rails 23a, 23b (which includes, respectively, the first and second rear air bearing surfaces 31, 32). The side rails 41, 42 serve to prevent the air stream that flows around the lateral ends of the front rail 21 from entering the space behind the front rail 21. Accordingly, after the air stream crosses the front air bearing surface 24, it spreads in the direction vertical to the disk surface so that a negative pressure is generated behind the front rail 21. When this negative pressure is balanced with the aforementioned lifts at the front air being surface 24, the first rear air being surface 31, and the second rear air bearing surfaces 32, the flying height of the slider body can be fixed. Grooves 43 are defined between the side rails 41, 42 and the rear rails 23a, 23b, respectively, so as to draw the air stream flowing around the lateral ends of the front rail 21 into the air stream passage 22.

The bottom surfaces of the first and second side rails 41, 42 form a generally planar surface with the side raised surfaces 27 and the front raised surface 25 of the front rail 21. A first rear protrusion, namely, an adhesion prevention pad 44, is formed on the bottom surface of the first side rail 41. The pad 44 has a tip end that is lower than the level of the first rear air bearing surface 31. The pad 44 serves to prevent the first rear air bearing surface 31 from directly contacting the disk surface of the magnetic disk 13 when the slider body is seated upon the disk surface. A second rear protrusion, namely, an adhesion prevention pad 45, is likewise formed on the side raised surface 38 of the rear rail 23b. The pad 45 has a tip end that is lower than the level of the second rear air bearing surface 32. The pad 45 serves to prevent the second rear air bearing surface 32 from directly contacting the disk surface of the magnetic disk 13 when the slider body is seated upon the disk surface.

Figure 3:
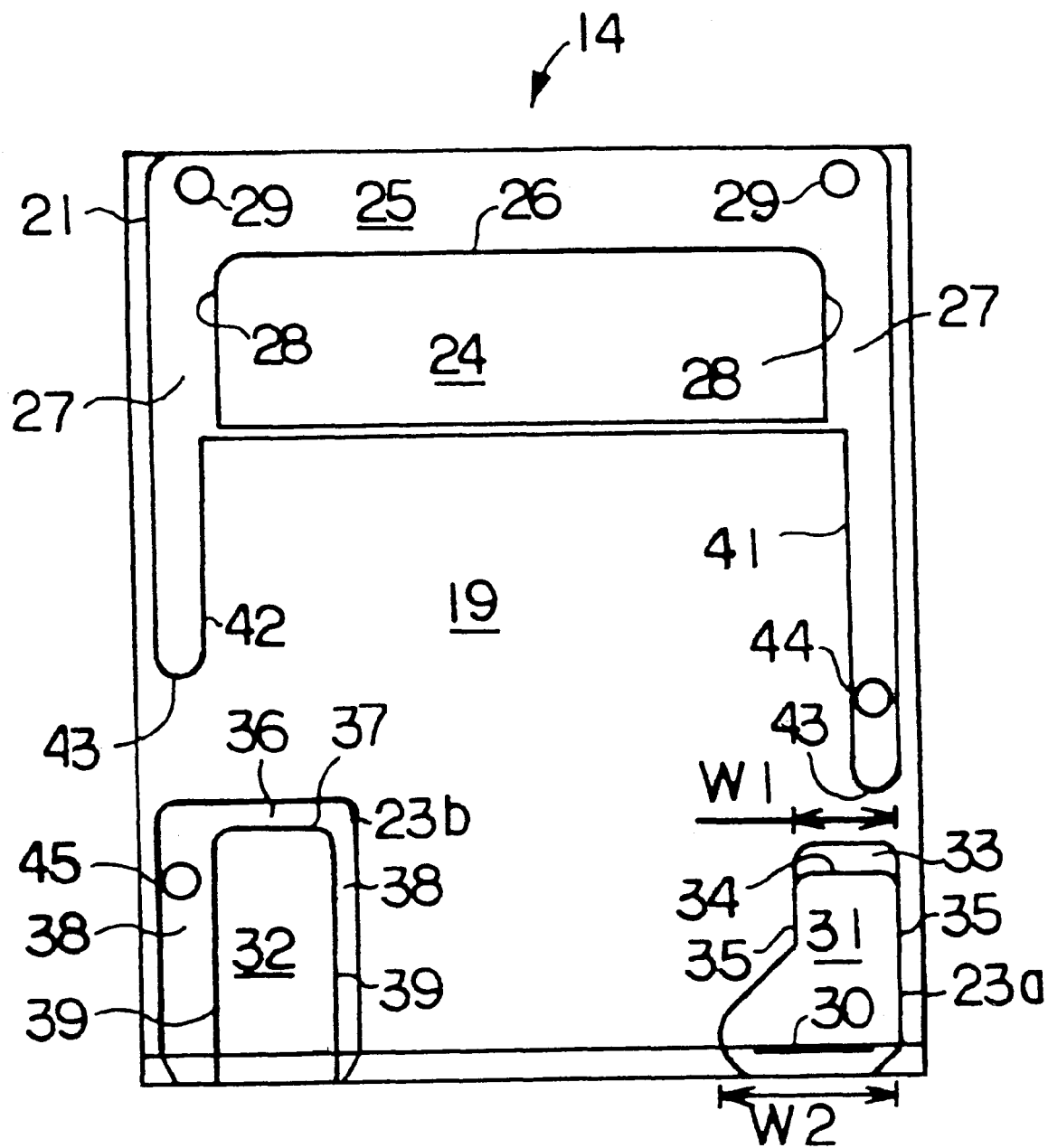
FIG. 3 is an enlarged plan view illustrating the bottom of the slider body.

As is apparent from FIG. 3, the first rear air bearing surface 31 includes an upstream end portion of a first lateral width W1, and a downstream end portion of a second lateral width W2 that is larger than the first width W1. For example, in the case where the transducer element 30 comprises a magnetoresistance (MR) element, the MR element needs to be protected by sandwiching it between a pair of shield layers. If the shield layers fail to have a lateral size that is large enough to shield the MR element from magnetic interference of the vicinal magnetic field, the MR element will not be able to properly read data off of the magnetic disk 13. The wider downstream end portion serves to allow the shield layers to extend far enough in the lateral direction of the slider body to protect the transducer element 30. When the lift at the second rear air bearing surface 32 is intended to be larger than that at the first rear air bearing surface 31, the second rear air bearing surface 32 needs be formed larger than the first rear air bearing surface 31. The narrower upstream end serves to reduce the area of the first rear air bearing surface 31, without affecting the protection of the transducer element 30. Thus, lift at the first rear air bearing surface 31 can accordingly be reduced by using the configuration shown in FIG. 3.

It should be noted that the upstream end of the first rear air bearing surface 31 is offset in the downstream direction as compared with the upstream end of the second rear air bearing surface 32. Such an offset position of the upstream end of the first rear air bearing surface 31 serves to reduce the length of the first rear air bearing surface 31 in the direction of the air stream as compared with that of the second rear air bearing surface 32. Accordingly, this smaller first rear air bearing surface 31 can be used to set the lift at the first rear air bearing surface 31 to be smaller than that at the second rear air bearing surface 32. Thus, it is possible to reduce the lift at the first rear air bearing surface 31 without a reduction in the lateral width of the shield layers that protect the MR element.

It should also be noted that the first side rail 41 (which is on the side of the first rear air bearing surface 31) extends further downstream as compared with the second side rail 42 (which is on the side of the second rear air bearing surface 32). As a result, a smaller or narrower groove 43 is obtained between the rear rail 23a and the first side rail 41. This narrower groove 43 serves to maintain a higher negative pressure behind the front rail 21. A higher negative pressure enables the first rear air bearing surface 31 to reliably approach the disk surface as closely as possible.

Furthermore, the pad 44 (which is located on the side of the first rear air bearing surface 31 that generates a smaller lift) is disposed more upstream of the air stream 20 than the pad 45 (which is located on the side of the second rear air bearing surface 32 that generates a larger lift). Since the roll angle β allows the first rear air bearing surface 31 to more closely approach the disk surface than the second rear air bearing surface 32, such disposition of the pad 44 helps to avoid collisions between the pad 44 and the disk surface.

When the magnetic disk 13 starts to rotate, an air stream 20 (see FIG. 2) starts to flow along the disk surface. The air stream 20 serves to allow the air bearing slider 14 seated on the disk surface to take off from the disk surface. Prior to taking off, the pads 29, 44, 45 keep the front and rear air bearing surfaces 24, 31, 32 a slight distance above the disk surface. Accordingly, there is less adhesion between the slider body and any lubricating agent or oil that may be spread over the disk surface. Thus, it is easier for the slider body to take off from the disk surface. During flight of the slider body, the transducer element 30 realizes the read/write operations.

Figure 4B:
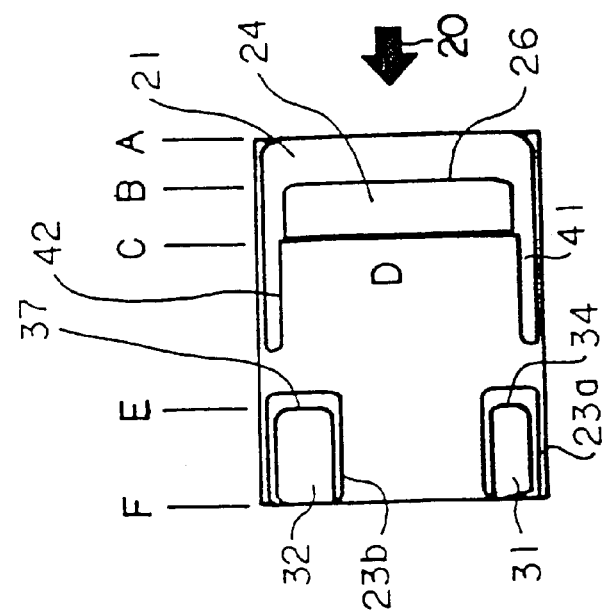
FIGS. 4A and 4B illustrate the pressure distribution for a negative pressure air bearing slider.
Figure 4A:
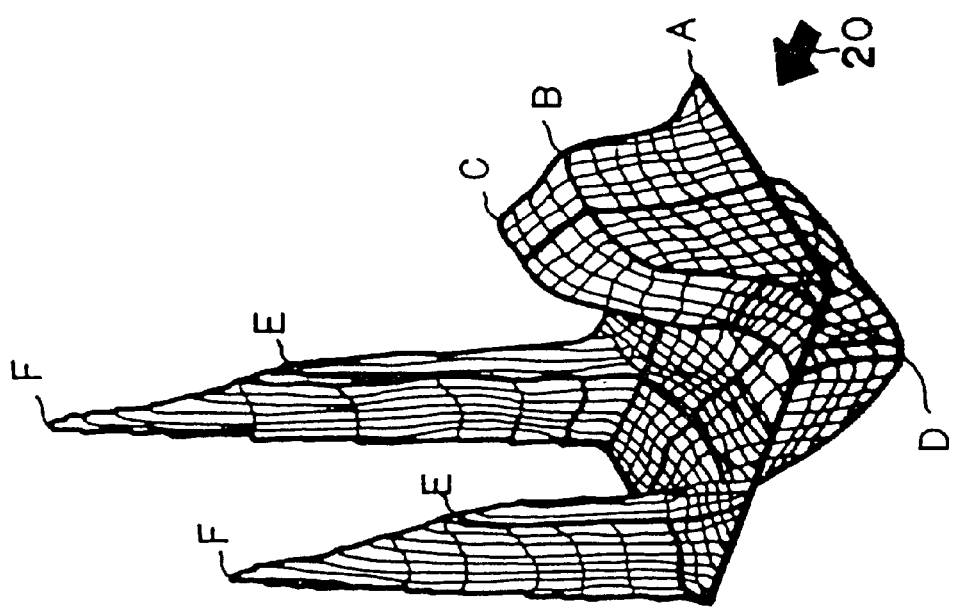

In general, the basic shape of the air bearing slider 14 of this embodiment, as shown in FIG. 4 for example, serves to generate lift (or positive pressure) and negative pressure along the bottom 19 of the slider body. It should be noted that FIGS. 4A and 4B relate only to the basic shape of the air bearing slider of FIG. 3, but do not include all of the specific details of the FIG. 3 embodiment. FIGS. 4A and 4B illustrate the pressure distribution, calculated by a conventional computer simulation, for an example of the basic shape of the air bearing slider. The slider body in this simulation has a length of 1.25 mm, a width of 1 mm, and a thickness of 0.3 mm. Of course other dimensions are also contemplated as being within the scope of the invention.

As is apparent from FIGS. 4A and 4B, the air stream 20 generates a large positive pressure at the front wall 26 in front of the front air bearing surface 24, namely, at position B. The positive pressure grows larger as the air stream 20 advances along the front air bearing surface 24.

When the air stream 20 has crossed the front rail 21, namely, at position C, the positive pressure disappears. Negative pressure appears in place of the positive pressure at position D. When the air stream 20 spreads in the direction vertical to the disk surface behind the front rail 21, this negative pressure is caused. In addition, the first and second side rails 41, 42 serve to prevent the air stream 20 that strikes the front face of the front rail 21 and then passes around the front rail 21 from entering the space behind the front rail 21. Accordingly, a larger negative pressure can be generated behind the front rail 21.

Upon reaching the rear rails 23a, 23b, the air stream 20 generates a large positive pressure at the front walls 34, 37, which are in front of the first and second rear air bearing surfaces 31, 32, namely, position E. This positive pressure grows larger as the air stream 20 advances along the first and second rear air bearing surfaces 31, 32, and then disappears at the downstream ends of the first and second rear air bearing surfaces 31, 32, namely, at position F.

The balance between the positive pressure, at positions B to C and E to F, and the negative pressure, at position D, serves to fix the flying height of the slider body in this air bearing slider. Moreover, when compared with conventional sliders, the larger positive pressure of the present invention is balanced with the larger negative pressure, so that higher stability in flying behavior is expected. The front walls 26, 34, 37 preferably have heights that are approximately equal to or less than 1/5 of the height H (see FIG. 2) of the front and rear rails 21, 23a, and 23b, in order to balance the positive and negative pressures with each other. In this embodiment, the heights of front walls 21, 23a, and 23b are approximately 0.2 μm.

In addition, the pair of rear air bearing surfaces 31, 32 create positive pressure at the downstream position nearest to the disk surface in slider bodies having a slanted attitude with a pitch angle α, which enhances the slider's resistance to rolling.

In general, when air pressure is low in the atmosphere where the magnetic disk drive 10 operates, the positive pressure at the front and rear air bearing surfaces 24, 31, 32 decreases in proportion to the reduction in air pressure. Accordingly, it is then necessary to reduce the negative pressure in proportion to the decrease in the positive pressure. If the negative pressure is kept constant when the positive pressure has been reduced, the flying height of the slider body will be decreased.

Figure 5:
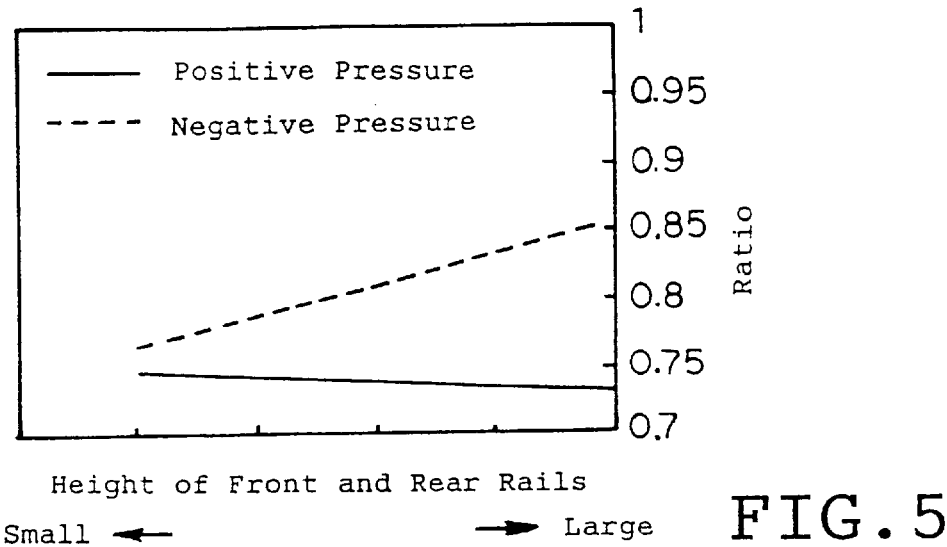
FIG. 5 is a graph demonstrating the effect of atmospheric pressure upon the pressure generated at the negative pressure air bearing slider.

FIG. 5 is a graph illustrating the effects of variations in air pressure. In the graph, the solid line shows the ratio of the positive pressure at an air pressure of 0.7 atm to the positive pressure at an air pressure of 1.0 atm, while the dotted line shows the ratio of the negative pressure at an air pressure of 0.7 atm to the negative pressure at an air pressure of 1.0 atm. As is apparent from the graph, the ratio of the positive pressure varies only slightly in response to variations in the height H (FIG. 2) of the front and rear rails 21, 23a, 23b (i.e., variations in the depth of the cavity surrounded by the front, side and rear rails 21, 41, 42, 23a, 23b). On the other hand, it can be observed that the difference between the ratio of the positive pressure and the ratio of the negative pressure decreases as the height of the front and rear rails 21, 23a, 23b decrease. Specifically, front and rear rails 21, 23a, 23b of lower heights better enable the negative pressure to follow variations in air pressure, so that it is possible to maintain a constant flying height of the slider body irrespective of variations in air pressure. It is expected that the front and rear rails 21, 23a, 23b of lower heights will allow the slider body to better maintain a constant flying height at various altitudes (with different atmospheric pressures) where the magnetic disk drive 10 will be operated. In this example of the first embodiment, the height H is preferably set to be no more than approximately 3 μm, and more preferably, it is set to be equal to or less than approximately 2 μm.

Front and rear rails 21, 23a, 23b of lower heights may cause a saturation of the negative pressure at a relatively low tangential velocity of the magnetic disk 13. When such saturation occurs, pressure can no longer increase to follow increases of the lift or positive pressure at the front and rear air bearing surfaces 24, 31, 32 as the tangential velocity of the magnetic disk 13 increases. Thus, the faster the tangential velocity becomes, the larger the flying height of the slider body gets. For example, the flying height of the slider body gets larger at positions nearer to the periphery of the magnetic disk 13 at which the tangential velocity is larger than positions nearer to the center of the magnetic disk 13.

Figure 6:
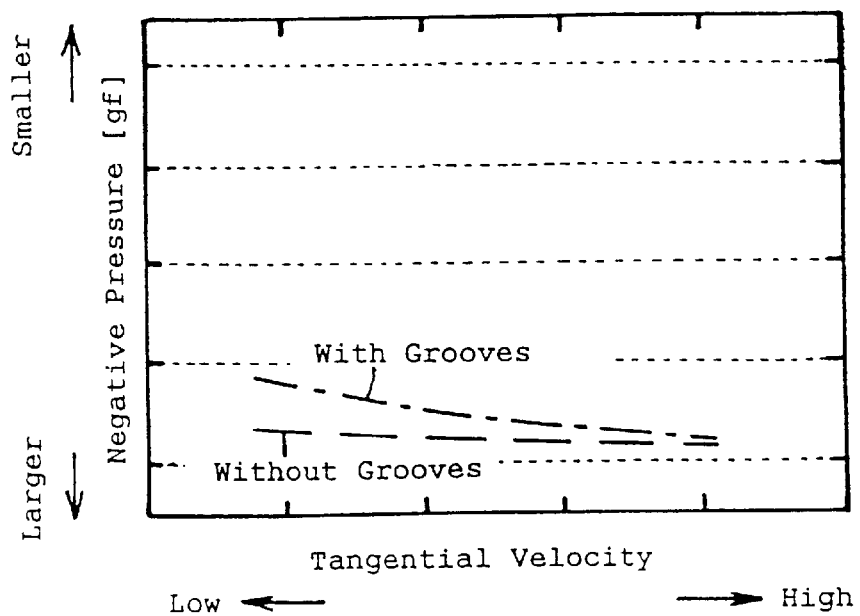
FIG. 6 is a graph demonstrating the effect of the grooves.

To solve this problem of saturation at relatively low tangential velocities, grooves 43 (FIG. 3) have been added. The grooves 43 enable the negative pressure to follow the tangential velocity in the air bearing slider of this type. As shown in FIG. 6 for example, it can be observed that when grooves are used, the negative pressure increases as the tangential velocity gets faster even if front and rear rails 21, 23a, 23b of lower heights are employed. As also shown in FIG. 6, a slider without grooves leads to a saturation of the negative pressure at a lower tangential velocity, whereby the negative pressure cannot increase anymore as the tangential velocity gets higher.

The grooves 43 are preferably positioned as far downstream as possible. If so, the cavity surrounded by the front and side rails 21, 41, 42 becomes larger, and therefore a larger negative pressure can be generated. In addition, the negative pressure area can also be shifted further downstream. Accordingly, it is possible to further stabilize the flying behavior of the slider body.

Figure 7:
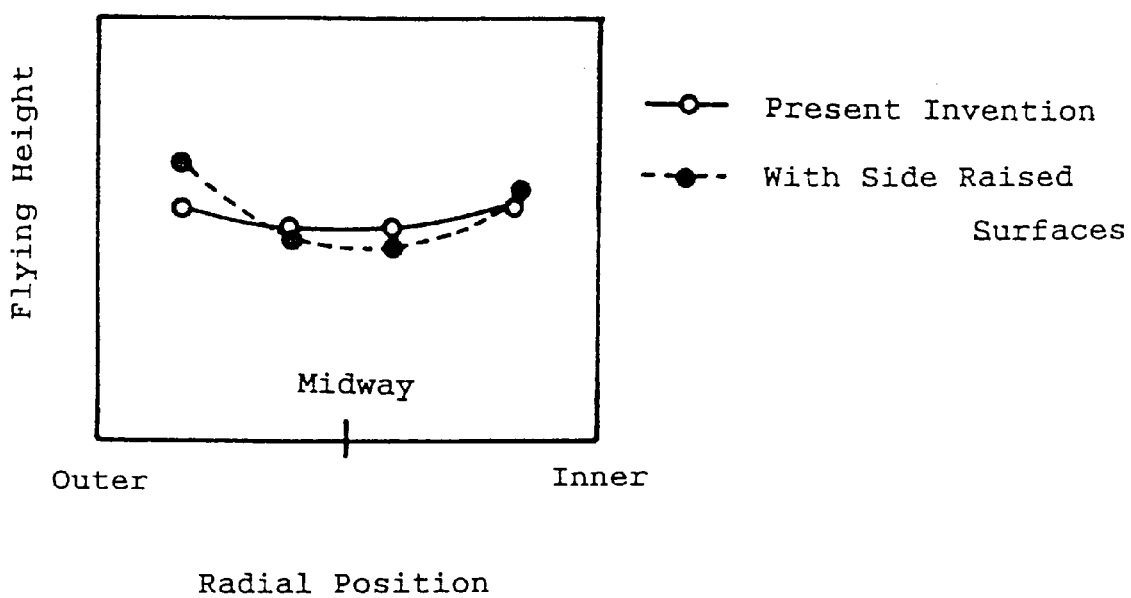
FIG. 7 is a graph demonstrating the variation in the flying height when the slider body moves in the radial direction of the magnetic disk.

Referring back to FIG. 1, it can be seen that, in this embodiment, the carriage arm 16 swings to move the air bearing slider 14 in the radial direction of the magnetic disk 13. As is apparent from FIG. 1, when the air bearing slider 14 is at the midway point of the radial course, it receives the air stream straight along its longitudinal direction. As the air bearing slider 14 approaches either the center or the outer periphery of the magnetic disk 13 along its radial course, the slider 14 receives the air stream in a direction that is oblique to its longitudinal direction. Even when the slider body receives the air stream from different directions, the air stream flows along a constant area of the front raised surface 33 and the front wall 34 of the rear rail 23a. Accordingly, as shown in FIG. 7, the lift generated at the first rear air bearing surface 31 hardly varies irrespective of variations in the orientation of the air stream. As is apparent from FIG. 7, with the present invention, variations in the flying height of the slider body can be reduced to the utmost irrespective of the slider's radial position on the magnetic disk 13.

It should be noted that the present invention preferably lacks side raised surfaces adjacent the first rear air bearing surface 31 (FIG. 3). For example, if side raised surfaces are formed adjacent the first rear air bearing surface 31 in the same manner as the side raised surfaces 27 and 38 on the front and second rear air bearing surface 24, 32, lift is generated at the side walls extending between the side raised surfaces and first rear air bearing surface 31 (in addition to the lift at the front wall 34) when the slider body receives the air stream in a direction that is oblique to its longitudinal direction. As is apparent from FIG. 7, the flying height of the slider body tends to increase as the slider body approaches either the center or the outer periphery of the magnetic disk 13 along its radial course. When side raised surfaces are used (as shown by the dashed line), the variations in flying height area larger than those in the present invention (shown by the solid line). Because collisions between the slider and the disk need to be avoided, the minimum flying height of the slider is determined with such height variations in mind. Accordingly, relatively large flying height variations (such as those found in the slider with side raised surfaces when compared with the present invention) do not permit the minimum flying height to be as close to the disk as it can be in a slider with relatively small height variations (such as those found in the present invention).

Figure 8A:
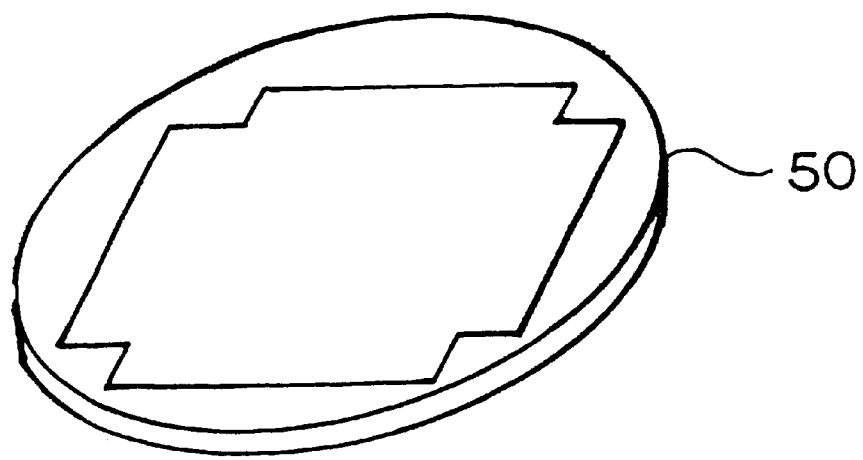
FIGS. 8A–8C schematically illustrate the production method of the air bearing slider.

Next, a description will be made of the preferred method of producing the air bearing slider 14. As shown in FIG. 8A, a plurality of transducer elements or magnetic head elements 30 are formed on the disk face of a wafer 50, which is preferably made of $Al_2O_3$—TiC with an $Al_2O_3$ layer formed thereon. The transducer elements 30 are respectively formed in blocks, with each defining a single air bearing slider 14. For example, 10,000 sliders (i.e., 100 rows by 100 columns, 100×100=10,000) can be cut out from a 5 inch diameter wafer. The transducer elements 30 are covered with a protection layer, preferably made of $Al_2O_3$.

Figure 8B:
Figure 8C:
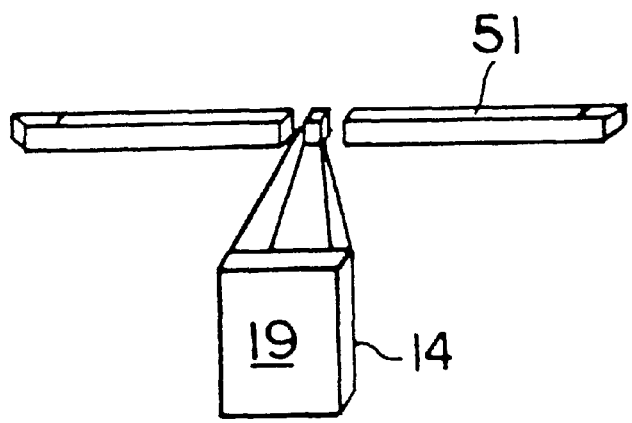

As shown in FIG. 8B, the wafer 50 on which the transducer elements 30 are formed is cut off into wafer bars 51 comprising sliders 14 in a row. The exposed surface 52 of the wafer bar 51 is configured into the bottom 19 of the slider body. Finally, as shown in FIG. 8C, each of the air bearing sliders 14 is cut off from the wafer bar 51.

Next, a more detailed description will be made for explaining how to configure the bottom 19 of the slider body. First, the exposed surface 52 of the wafer bar 51 is covered with a uniform first diamond-like-carbon (DLC) layer with a first Si adhesion layer interposed therebetween. A second DLC layer is then layered over the first DLC layer with a second Si adhesion layer interposed therebetween.

Figure 9:
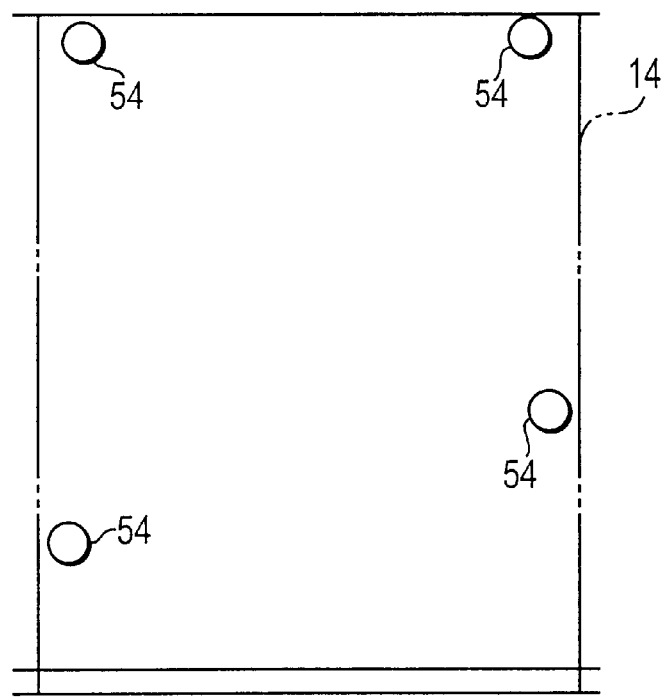
FIG. 9 is a plan view of the wafer bar illustrating a pad pattern.
Figure 10:
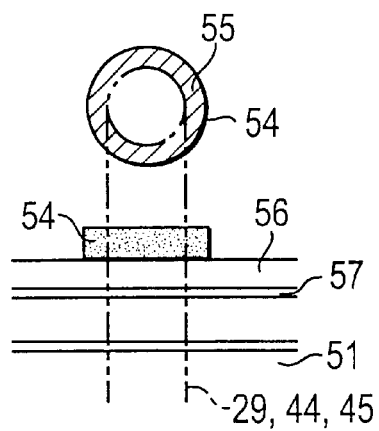
FIG. 10 is an enlarged sectional view of a part of the wafer bar illustrating the method for producing the adhesion prevention pad.
Figure 11:
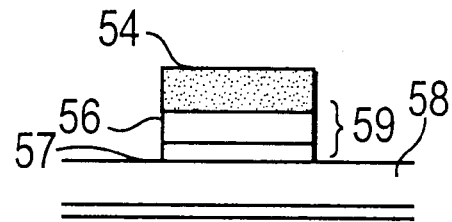
FIG. 11 is an enlarged sectional view of a part of the wafer bar illustrating the production method of the adhesion prevention pad.

As shown in FIG. 9, a film resist 54 of a pad pattern is formed on the surface of the second DLC layer so as to define the contours of the pads 29, 44, 45 (FIG. 3). As shown in FIG. 10, the film resist 54 defines a margin 55 around the contour of the pads 29, 44, 45. The second DLC layer 56 and the second Si adhesion layer 57 exposed around the film resist 54 are then removed using a reactive ion etching method (RIE) or the like. As a result, as shown in FIG. 11, pad materials 59 are shaped to rise from the first DLC layer 58. The film resist 54 is thereafter removed.

Figure 12:
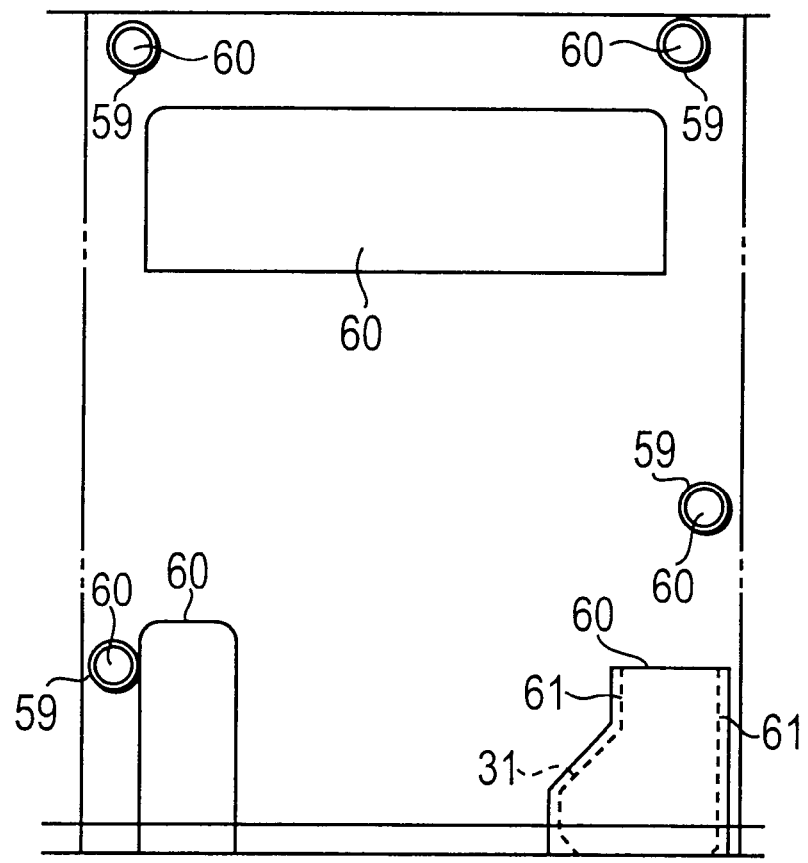
FIG. 12 is a plan view of the wafer bar illustrating a first pattern.

As shown in FIG. 12, a photoresist 60 of a first pattern is formed to define the contours of the front and rear air bearing surfaces 24, 31, 32 (FIG. 3). The photoresist 60 precisely covers the areas corresponding to the front and second rear air bearing surface 24, 32. At the same time, the photoresist 60 also covers an area that is slightly larger, in the lateral direction, than the area of the first rear air bearing surface 31. Specifically, the photoresist covers margins 61, which are adjacent the sides of the first rear air bearing surface 31. The photoresist 60 on the pad materials 59 defines the contours of the pads 29, 44, 45. No margins are defined around the contours of the pads 29, 44, 45. The pattern may be defined using a mask.

Figure 13:
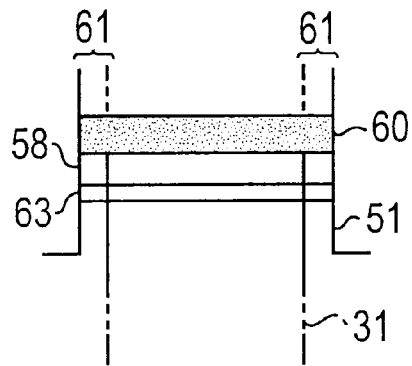
FIG. 13 is an enlarged sectional view of a part of the wafer bar illustrating the production method of the first rear air bearing surface.
Figure 14:
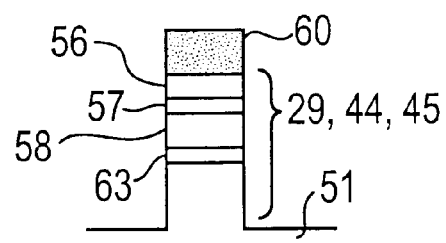
FIG. 14 is an enlarged sectional view of a part of the wafer bar illustrating the production method of the adhesion prevention pad.

After exposure and development, the first DLC layer 58 and the first Si adhesion layer 63, as well as the body of the wafer bar 51 around the photoresist 60, are removed using an ion milling method or the like. The front and second rear air bearing surfaces 24, 32, which are covered with the second DLC layer 56, are configured to define the front walls 26, 37 and the side walls 28, 39. However, as shown in FIG. 13, the first DLC layer 58, the body of the wafer bar 51, and the like located under the photoresist 60 corresponding to the margins 61 remain in order to prevent the contour of the first rear air bearing surface 31 from appearing. As shown in FIG. 14, the pads 29, 44, 45 covered with the second DLC layer 56 are shaped out of the pad materials 59. The photoresist 60 is thereafter removed.

Another photoresist 66 of a second pattern is then formed to define the contours of the front, side and rear rails 21, 41, 42, 23a, 23b. The photoresist 66 precisely covers the areas corresponding to the front, side and rear rails 21, 41, 42, 23b. The shaped front and second rear air bearing surfaces 24, 32 and the shaped pads 29, 44, 45 are covered with the photoresist 66. At the same time, the photoresist 66 defines the contour of the rear rail 23a, so that the first rear air bearing surface 31 and an additional area upstream of the first rear air bearing surface 31 are covered with the photoresist 66. The pattern may be defined using a mask.

After exposure and development, the body of the wafer bar 51 exposed around the photoresist 66 is removed using an ion milling method or the like. The front, side and rear rails 21, 41, 42, 23a, 23b are finally configured.

Figure 16:
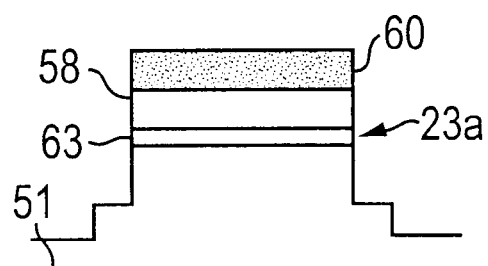
FIG. 16 is an enlarged sectional view of a part of the wafer bar illustrating the production method of the first rear air bearing surface and the rear rail.

As shown in FIG. 16, the first DLC layer 58, the body of the wafer bar 51, and the like are removed adjacent the first rear air bearing surface 31 in the lateral direction of the slider body. Since portions corresponding to the margins 61 are removed, no step is formed adjacent the first rear air bearing surface 31 in the lateral direction. Although a small hill remains adjacent the rear rail 23a on the bottom 19 of the slider body, it fails to contribute to an increase in the positive pressure at the first rear air bearing surface 31. On the other hand, the additional area 67 serves to form the front raised surface 33 and the front wall 34 upstream of the first rear air bearing surface 31. The production of the slider body is completed when the photoresist 66 is finally removed.

The above mentioned method serves to reliably avoid the formation of any step adjacent the first rear air bearing surface 31 in the lateral direction of the slider body even if the mask of the second pattern is offset with respect to the mask of the first pattern. Accordingly, the aforementioned air bearing slider 14 is reliably provided.

Figure 17:
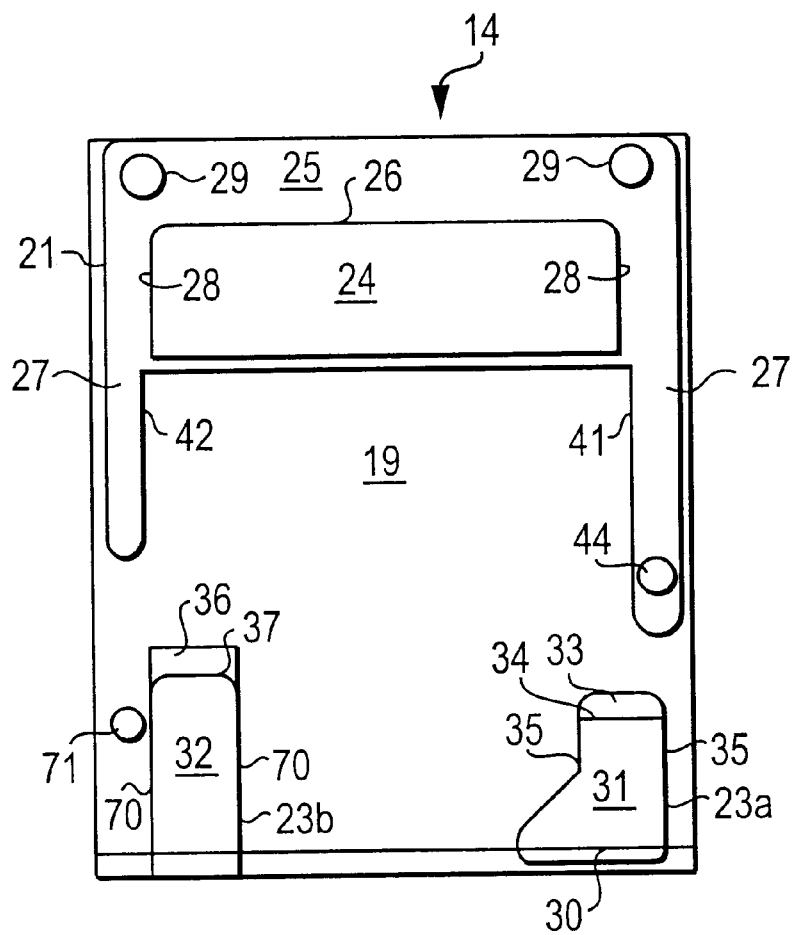
FIG. 17 is an enlarged plan view illustrating an air bearing slider according to another embodiment of the present invention.

The air bearing slider 14 of a second embodiment may include, as shown in FIG. 17, a rear rail 23b without the aforementioned side raised surfaces 38 (shown in FIG. 3). In this embodiment, side walls 70 that extend along the lateral sides of the second rear air bearing surface 32 are connected to the bottom 19 of the slider body without any interruption of a step, in the same manner as the first rear air bearing surface 31. Moreover, the side walls 70 include, as is apparent from FIG. 17, a shorter portion that extends between the bottom 19 of the slider body and the front edge the front raised surface 36, and two taller portions that extend between the bottom 19, and the side edges of the second rear air bearing surface 32. The shorter portion and both taller portions of the side walls 70 are continuously connected to each other.

This type of the rear rail 23b may be produced in the same manner as described above. However, in this embodiment the pad is not formed on the rear rail 23b, but is instead formed separately, such as shown by pad 71. As with pad 45 of FIG. 3, pad 71 of this embodiment is included in the slider body for avoiding contact between the second rear air bearing surface 32 and the disk surface when the slider body is seated upon the disk surface.

Figure 19:
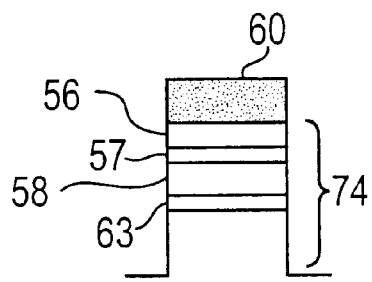
FIG. 19 is an enlarged sectional view of a part of the wafer bar illustrating the production method of the adhesion prevention pad.
Figure 15:
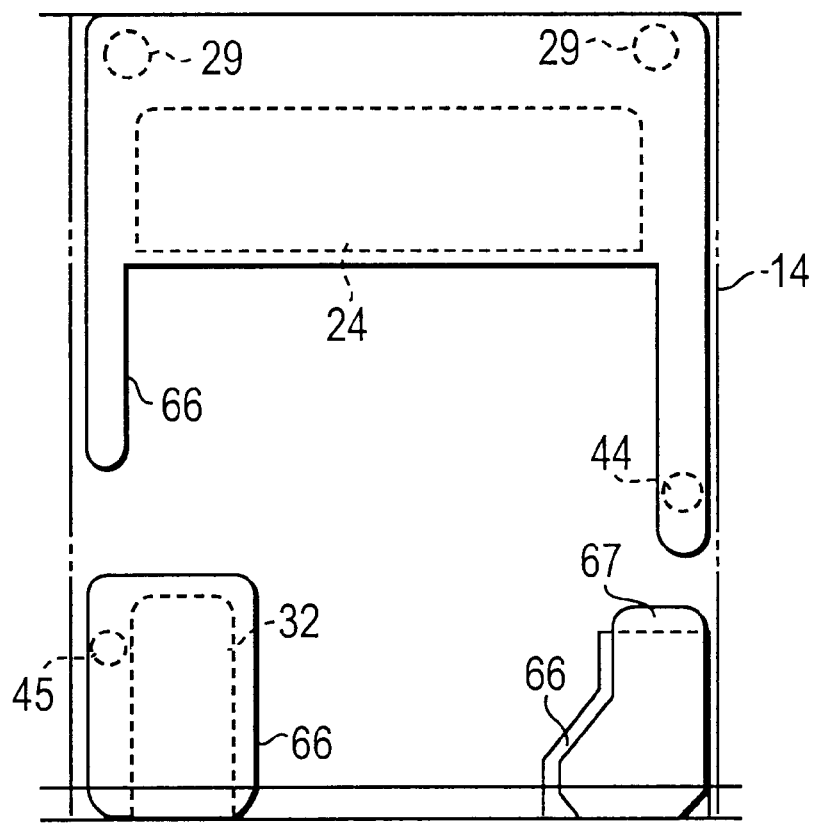
FIG. 15 is a plan view of the wafer bar illustrating a second pattern.
Figure 18:
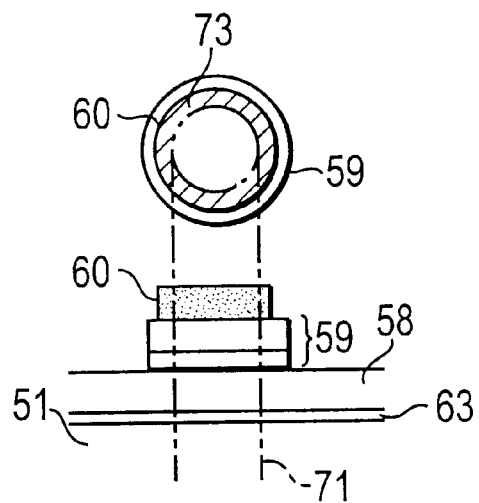
FIG. 18 is an enlarged sectional view of a part of the wafer bar illustrating the production method of the adhesion prevention pad.

Next, a brief description will be made of the production method of the pad 71. First, a first pad material 59 is formed on the first DLC layer 58 as described above referring to FIG. 11. The photoresist 60 is then formed on the first pad material 59 as shown in FIG. 18. The area of the photoresist 60 is oversized to cover margin 73 around the contour of the pad 71. After exposure and development, when the first DLC layer 58, the first Si adhesion layer 63 and the body of the wafer bar 51 are removed, a second pad material 74 is shaped out of the first pad material 59 as shown in FIG. 19. When the photoresist is thereafter formed on the second pad material 74 so as to define the contour of the pad 71, the pad 71 is shaped out of the second pad material 74 without any step around the pad 71.

It should be noted that the negative pressure air bearing slider 14 of the present invention may be employed in a storage disk drive other than the aforementioned hard disk drive (HDD) 10.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An air bearing slider comprising:
   a slider body, said slider body being defined by a front face, a rear face, and two opposed side faces that generally connect said front face with said rear face, wherein said front face faces an upstream end of said slider body and said rear face faces a downstream end of said slider body;
   a front air bearing surface formed on a front rail that extends from a bottom of the slider body, said front rail being located near said upstream end of said slider body;
   a rear air bearing surface formed on a rear rail that extends from said bottom of said slider body, said rear rail being located near said downstream end of said slider body, wherein said front rail and said rear rail are separated from each other by a portion of the slider body;
   a front raised surface of said rear rail formed upstream of said rear air bearing surface, said front raised surface having a level that is higher, with respect to a disk surface, than that of said rear air bearing surface;
   a first front wall that connects an upstream end of said rear air bearing surface with a downstream end of said front raised surface;
   a second front wall of said rear rail located at an upstream of said rear rail;
   a rear wall of said rear rail located at a downstream end of said rear air bearing surface; and
   two side walls of said rear rail that extend between said second front wall and said rear wall and between a side edge of said rear rail and said bottom of said slider body, at least one of said side walls not being interrupted by a step;
   wherein said front raised surface extends from one of said side walls to the other of said side walls.

2. The air bearing slider according to claim 1, wherein said at least one side wall includes an inner side wall and an outer side wall, and further wherein said inner side wall extends between said bottom of said slider body and an inner edge defined by said inner peripheral edges of said front raised surface, said front wall, and said rear air bearing surface, and said outer side wall extends between said bottom of said slider body and outer edge defined by said outer peripheral edges of said front raised surface, said front wall, and said rear air bearing surface.

3. An air bearing slider comprising:
   a slider body, said slider body being defined by a front face, a rear face, and two opposed side faces that generally connect said front face with said rear face, wherein said front face faces an upstream end of said slider body and said rear face faces a downstream end of said slider body;
   a front air bearing surface formed on a front rail that extends from a bottom of a slider body, said front rail being located near said upstream end of said slider body;
   first and second rear air bearing surfaces formed on first and second rear rails, respectively, said first and second rear rails extending from said bottom of said slider body, said first and second rear rails being located near a downstream end of said slider body, wherein said front rail and said first and second rear rails are separated from each other by a portion of the slider body;
   a transducer element embedded in said first rear air bearing surface;
   a front raised surface of said first rear rail formed upstream of said first rear air bearing surface, said front raised surface having a level that is higher with respect to a disk surface than that of said first rear air bearing surface;
   a first front wall that connects an upstream end of said first rear air bearing surface with a downstream end of said front raised surface;
   a second front wall of said rear rail located at an upstream end of said rear rail;
   a rear wall of said rear rail located at a downstream end of said rear air bearing surface; and
   two side walls of said rear rail that extend between said second front wall and said rear wall and between an edge of said first rear rail and said bottom of said slider body at least one of said side walls not being interrupted by a step;
   wherein said front raised surface extends from one of said side walls to the other of said side walls.

4. The air bearing slider according to claim 3, further comprising:
   a second front raised surface formed upstream of said second rear air bearing surface, said second front raised surface having a level that is higher, with respect to the disk surface than that of said second rear air bearing surface;
   a second front wall that extends between an upstream end of said second rear air bearing surface and a downstream end of said second front raised surface;
   side raised surfaces formed on both sides of said second rear air bearing surface, wherein said side raised surfaces extend in opposite lateral directions at a level that is higher with respect to the disk surface, than that of said second rear air bearing surface; and
   a set of second side walls that extend between lateral edges of said side raised surfaces and said second rear air bearing surface.

5. The air bearing slider according to claim 4, wherein said second front raised surface and said side raised surfaces are all substantially planar with each other.

6. The air bearing slider according to claim 4, further comprising:
   a third front raised surface formed upstream of said front air bearing surface, said third front raised surface having a level that is higher, with respect to the disk surface, than that of said front air bearing surface; and
   at least one front protrusion formed on said third front raised surface, said front protrusion extending past the level of said front air bearing surface.

7. The air bearing slider according to claim 6, further comprising:
   a front rail formed on the bottom of the slider body near an upstream end thereof so as to extend in the lateral direction, said front rail including said third raised surface, with said front air bearing surface being positioned upon a top surface of said front rail;

first and second side rails extending from opposite lateral ends of said front rail toward said first and second rear air bearing surfaces, respectively, so as to define top surfaces that are substantially planar with respect to said third raised surface of said front rail;

a first rear protrusion formed on the top surface of said first side rail, said first rear protrusion extending past the level of said first rear air bearing surface; and a second rear protrusion formed on one of said side raised surfaces associated with said second rear air bearing surface, said second rear protrusion extending past the level of said second rear air bearing surface.

8. The air bearing slider according to claim 3, further comprising:

a second front raised surface formed upstream of said second rear air bearing surface, said second front raised surface having a level that is higher, with respect to the disk surface, than that of said second air bearing surface; and a second front wall that extends between an upstream end of said second rear air bearing surface and a downstream end of said second front raised surface.

9. The air bearing slider according to claim 8, further comprising:

a third front raised surface formed upstream of said front air bearing surface, said third front raised surface having a level that is higher, with respect to the disk surface than that of said front air bearing surface; and at least one front protrusion formed on said third front raised surface, said front protrusion extending past the level of said front air bearing surface.

10. The air bearing slider according to claim 9, further comprising:

a front rail formed on the bottom of the slider body near an upstream end thereof so as to extend in the lateral direction, said front rail including said third raised surface, with said front air bearing surface being positioned upon a top surface of said front rail;

first and second side rails extending from opposite lateral ends of said front rail toward said first and second rear air bearing surfaces, respectively, so as to define top surfaces that are substantially planar with respect to said third raised surface of said front rail;

a first rear protrusion formed on the top surface of said first side rail, said first rear protrusion extending past the level of said first rear air bearing surface; and a second rear protrusion formed on said bottom of said slider body and extending past the level of said second rear air bearing surface.

11. The air bearing slider according to claim 3, further comprising:

a front rail formed on said bottom of said slider body near an upstream end thereof so as to extend in the lateral direction, said front rail having said front air bearing surface positioned upon its top surface; and first and second side rails extending from opposite lateral ends of said front rail toward said first and second rear air bearing surfaces, respectively, so as to define top surfaces that are substantially planar with respect to said top surface of said front rail, wherein said first side rail extends further downstream than said second side rail.

12. The air bearing slider according to claim 3, further comprising:

a second front raised surface formed upstream of said second rear air bearing surface, said second front raised surface having a level that is higher, with respect to the disk surface, than that of said second air bearing surface;

a second front wall that extends between an upstream end of said second rear air bearing surface and a downstream end of said second front raised surface;

a front rail formed on said bottom of said slider body near an upstream end thereof so as to extend in the lateral direction, said front rail having said front air bearing surface positioned upon its top surface; and first and second side rails extending from opposite lateral ends of said front rail toward said first and second rear air bearing surfaces, respectively, so as to define top surfaces that are substantially planar with respect to said top surface of said front rail; and wherein said front raised surface, said second front raised surface, and said top surfaces of said front rail, said first side rail, and said second side rail are all substantially planar with each other.

13. A storage disk drive comprising:

at least one disk adapted to have information stored thereon;

a motor for rotating said at least one disk;

an actuator arm adapted to move along different radial positions of said at least one disk;

an air bearing slider located near a distal end of said actuator arm; and wherein said air bearing slider includes:

a slider body, said slider body being defined by a front face, a rear face, and two opposed side faces that generally connect said front face with said rear face, wherein said front face faces an upstream end of said slider body and said rear face faces a downstream end of said slider body;

a front air bearing surface formed on a front rail that extends from a bottom of the slider body, said front rail being located near said upstream end of said slider body;

a rear air bearing surface formed on a rear rail that extends from said bottom of said slider body, said rear rail being located near said downstream end of said slider body, wherein said front rail and said rear rail are separated from each other by a portion of the slider body;

a front raised surface of said rear rail formed upstream of said rear air bearing surface, said front raised surface having a level that is higher, with respect to a disk surface, than that of said rear air bearing surface;

a first front wall that connects an upstream end of said rear air bearing surface with a downstream end of said front raised surface;

a second front wall of said rear rail located an upstream end of said rear rail;

a rear wall of said rear rail located at a downstream end of said rear air bearing surface; and two side walls of said rear rail that extend between said second front wall and said rear wall and between a side edge of said rear rail and said bottom of said slider body, at least one of said side walls not being interrupted by a step;

wherein said front raised surface extends from one of said side walls to the other of said side walls.

14. An air bearing slider comprising:

a slider body, said slider body being defined by a front face, a rear face, and tow opposed side faces that generally connect said front face with said rear face, wherein said front face faces an upstream end of said slider body and said rear face faces a downstream end of said slider body;

a front rail that extends from a bottom of the slider body, said front rail being located near said upstream end of said slider body;

a front air bearing surface formed on said front rail;

a rear rail that extends from said bottom of said slider body, said rear rail being located near said downstream end of said slider body, wherein said front rail and said rear rail are separated from each other by a portion of said bottom;

a rear air bearing surface formed on said rear rail;

a front raised surface of said rear rail formed upstream of said rear air bearing surface, said front raised surface having a level that is higher, with respect to a disk surface, than that of said rear air bearing surface;

a first front wall that connected an upstream end of said rear air bearing surface with a downstream end of said front raised surface;

a second front wall of said rear rail located at an upstream end of said rear rail;

a rear wall of said rear rail located at a downstream end of said rear air bearing surface; and two side walls of said rear rail that extend between said second front wall and said rear wall, wherein at least a side edge of said first front wall is connected to one of said side walls.

* * * * *

UNITED STATES PATENT AND TRADEMARK OFFICE
CERTIFICATE OF CORRECTION

PATENT NO.    : 6,351,345 B1
DATED         : February 26, 2002
INVENTOR(S)   : Masaki Kameyama It is certified that error appears in the above-identified patent and that said Letters Patent is hereby corrected as shown below:

Column 15,
Line 32, insert -- , -- after "surface".

Column 16,
Line 57, insert -- at -- after "located".

Column 17,
Line 3, delete "tow" and insert -- two -- therefore.

Signed and Sealed this

Seventeenth Day of September, 2002

Attest:

Attesting Officer

JAMES E. ROGAN
Director of the United States Patent and Trademark Office